(12) United States Patent
Sakai et al.

(10) Patent No.: US 7,759,570 B2
(45) Date of Patent: Jul. 20, 2010

(54) MATERIAL FOR KEYS OF KEYBOARD

(75) Inventors: Toshiro Sakai, Shuchi-gun (JP);
Shigeru Muramatsu, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 0 days.

(21) Appl. No.: 12/052,988

(22) Filed: Mar. 21, 2008

(65) Prior Publication Data
US 2008/0229903 A1 Sep. 25, 2008

(30) Foreign Application Priority Data
Mar. 23, 2007 (JP) .............................. 2007-077445

(51) Int. Cl.
*G10C 3/12* (2006.01)
(52) U.S. Cl. .............................. 84/433; 84/427; 84/437; 84/438
(58) Field of Classification Search .................. 84/427, 84/433, 437, 438
See application file for complete search history.

(56) References Cited

U.S. PATENT DOCUMENTS

| | | | | |
|---|---|---|---|---|
| 4,346,639 A | * | 8/1982 | Vagias | 84/437 |
| 4,563,495 A | * | 1/1986 | Kawaguchi et al. | 524/413 |
| 4,960,805 A | * | 10/1990 | Oshima | 524/26 |
| 5,137,941 A | * | 8/1992 | Oshima | 523/222 |
| 5,223,652 A | * | 6/1993 | Ishida et al. | 84/427 |
| 5,265,515 A | * | 11/1993 | Calabrese et al. | 84/437 |
| 5,509,344 A | * | 4/1996 | Calabrese et al. | 84/437 |
| 5,559,297 A | * | 9/1996 | Yoshikawa et al. | 84/433 |
| 6,211,450 B1 | * | 4/2001 | Ishida | 84/423 R |
| 6,429,265 B2 | * | 8/2002 | Nishida | 525/329.5 |
| 7,273,501 B2 | * | 9/2007 | Nakashima et al. | 8/115.51 |
| 7,468,414 B2 | * | 12/2008 | Nishida | 525/329.7 |
| 2004/0117917 A1 | * | 6/2004 | Kando et al. | 8/115.51 |
| 2006/0251694 A1 | * | 11/2006 | Nielsen et al. | 424/422 |
| 2006/0282052 A1 | * | 12/2006 | Saito et al. | 604/372 |
| 2007/0137461 A1 | * | 6/2007 | Yamaguchi | 84/438 |
| 2008/0105106 A1 | * | 5/2008 | Osuga | 84/437 |
| 2008/0229903 A1 | * | 9/2008 | Sakai et al. | 84/437 |

FOREIGN PATENT DOCUMENTS

| | | |
|---|---|---|
| EP | 0 371 939 A2 | 11/1990 |
| EP | 0 716 882 A1 | 6/1996 |
| JP | 2-146592 | 6/1990 |
| JP | 8-225610 | 9/1996 |
| WO | WO-2005/083673 A1 | 9/2005 |

OTHER PUBLICATIONS

"High Capacity Organic Polymer Defumidifier", URL:http://www.exlan.co./jp/products/beads/tafticHU.html, applicant viewed Mar. 3, 2008.

* cited by examiner

*Primary Examiner*—Jeffrey Donels
*Assistant Examiner*—Robert W Horn
(74) *Attorney, Agent, or Firm*—Dickstein Shapiro LLP

(57) ABSTRACT

A material for a key of a keyboard instrument may include, but is not limited to, a base resin; and particles of a moisture control material that performs chemical sorption of moisture. The moisture control material increase in volume with moisture-sorption. The moisture control material decrease in volume with moisture-desorption.

9 Claims, 6 Drawing Sheets

MATERIAL FOR KEYS OF KEYBOARD

BACKGROUND OF THE INVENTION

1. Field of the Invention

The present invention generally relates to a material for keys of keyboard musical instruments.

Priority is claimed on Japanese Patent Application No. 2007-077445, filed Mar. 23, 2007, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Natural ivory is an ideal material for keys of keyboard musical instruments such as piano, organ, and accordion. Natural ivory can not be used in view of the environmental protection. Instead of natural ivory, an acrylic resin has often been used for keys of keyboard musical instruments. The acrylic resin key has almost no hygroscopicity. The surface of the acrylic resin key is slippery at high humidity. The slippery key is unsuitable for musical performance.

Japanese Unexamined Patent Application, First Publication, No. 2-146592 discloses that, for keys of keyboard musical instruments, an inorganic porous material is mixed to a resin which is a base resin, thereby increasing hygroscopicity. The porous material embedded near the surface of the key may absorb moisture such as sweat from a finger of a performer, thereby providing dry-feeling to a performer. The porous material in the key may also absorb stain. Use of the keys of keyboard musical instruments for long time can make the key stained.

In view of the above, it will be apparent to those skilled in the art from this disclosure that there exists a need for a material for keys of keyboard musical instruments. This invention addresses this need in the art as well as other needs, which will become apparent to those skilled in the art from this disclosure.

SUMMARY OF THE INVENTION

Accordingly, it is a primary object of the present invention to provide a material for key of a keyboard musical instrument.

It is another object of the present invention to provide a material for key of a keyboard musical instrument for allowing the key to have a non-slippery surface at high humidity and stain-proof for long time use.

It is a further object of the present invention to provide a key for a keyboard musical instrument.

It is a still further object of the present invention to provide a key for a keyboard musical instrument for allowing the key to have a non-slippery surface at high humidity and stain-proof for long time use.

In accordance with a first aspect of the present invention, a material for key of a keyboard instrument may include, but is not limited to, a base resin; and particles of a moisture control material that performs chemical sorption of moisture. The moisture control material increase in volume with moisture-sorption. The moisture control material decrease in volume with moisture-desorption.

In some cases, the particles have an averaged particle size in the range of 3 micrometers to 5 micrometers.

In some cases, the content of the moisture control material may be ranged from 2 wt % to 4 wt %.

In some cases, the material for key may further include a condensation inhibitor that inhibits or controls condensation of the particles of the moisture control material during production process for producing the material for key.

In some cases, the material for key may have a friction coefficient in the range of 0.21 to 0.26 at a relative humidity ranged from 30% to 90%.

In some cases, the moisture control material may be a polymer having an ionizable functional group in its side chain.

In accordance with a second aspect of the present invention, a key for a keyboard instrument may include, but is not limited to, a base resin, and particles of a polymer that shows sorption and desorption of moisture. The polymer increases in volume with moisture-sorption. The polymer decreases in volume with moisture-desorption. The particles have an averaged particle size in the range of 3 micrometers to 5 micrometers. The key has a friction coefficient in the range of 0.21 to 0.26 at a relative humidity ranged from 30% to 90%.

In some cases, the content of the polymer may be ranged from 2 wt % to 4 wt %.

In some cases, the polymer may have an ionizable functional group in its side chain.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

The embodiment of THE present invention provides an ideal material for keys of keyboard musical instruments such as piano, organ, and accordion. Examples of the keys may include, but are not limited to, white key and black key.

Figure 1:
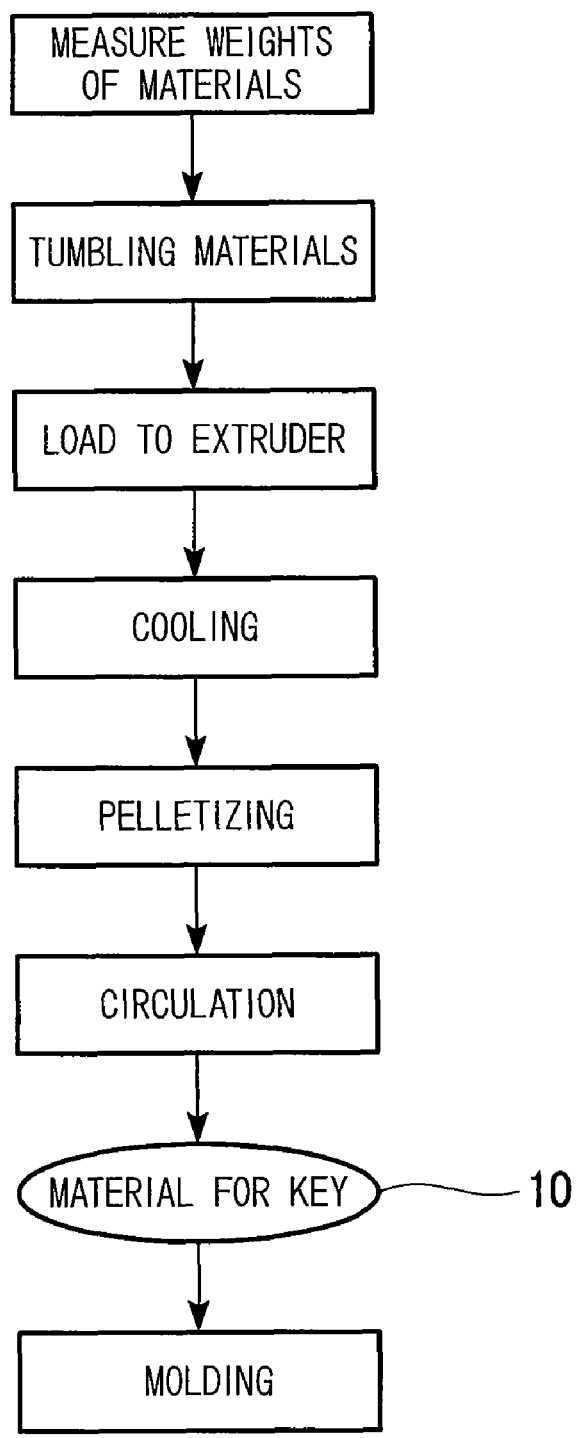
FIG. 1 is a flow chart illustrating a method of forming a key using a material for the key in accordance with a first embodiment of the present invention.

FIG. 1 is a flow chart illustrating a method of forming a key using a material for the key in accordance with a first embodiment of the present invention. A material 10 for key can be formed by, but is not limited to, a method that includes measuring raw materials, tumbling or mixing the raw materials, loading the mixed material to a hopper of an extruder, cooling the extruded material, pelletizing the cooled material, and circulating pellets of the material. The material 10 for key may be pellets of the materials for molding the pellets of the materials, thereby forming a key or keys. Each key may have a shape that is decided by a pitch. A variety of methods such as an injection molding method and an extrusion molding method, which uses resin pellets can be used in order to form the key or keys.

The following Table 1 shows compositional ratios of the compositions of the material 10 for key.

TABLE 1

| | Comp. Ratio Range | Examples | Comp. Ratio |
|---|---|---|---|
| Base Resin 11 | 81-60 wt % | Acrylic Resin (PMMA) | 80 wt % |
| Moisture Control Material 12 | 2-4 wt % | Acrylic Polymer (Taftic ® HU) | 3 wt % |
| Condensation Inhibitor 13 | 16-35 wt % | Precipitated Barium Sulfate | 16 wt % |
| Other Materials 14 | 1 wt % | Condensation-inhibition enhancer | 1 wt % |

The material 10 for key may include, but is not limited to, a base resin 11, a moisture control material 12, a condensation inhibitor 13, and other materials 14. The material 10 for key may have the following compositional ratio. In some cases, the material 10 for key may include, but is not limited to, 81-60 wt % of the base resin 11, 2-4 wt % of the moisture control material 12, 16-35 wt % of the condensation inhibitor 13, and 1 wt % of the other materials 14. All of those materials are weight-measured in the measuring step S1, and then mixed with each other in the tumbling step S2. A typical example of the base resin 11 may include, but is not limited to, an acrylic resin. A typical example of the acrylic resin that can be used for the base resin 11 may include, but is not limited to, a polymethyl methacrylate (PMMA) resin. A typical example of the moisture control material 12 may include, but is not limited to, particles of an acrylic polymer and an acrylonitrile polymer. A typical example of the acrylic polymer that can be used for the moisture control material 12 may include, but is not limited to, Taftic® HU, which is commercially available from Japan Exlan Co., Ltd. The moisture control material 12 may be not only particles of a polymer such as described above but particles of an organic or inorganic material that can exhibit sorption and desorption cyclically. A typical example of the condensation inhibitor 13 may include, but is not limited to, precipitated barium sulfate. The other materials 14 may include, but is not limited to, condensation-inhibition enhancer alone or in combination with other additive or additives. The condensation-inhibition enhancer can control the condensation of the moisture control material 12 in cooperation with the condensation inhibitor 13. In other words, the condensation-inhibition enhancer can control the performance of the condensation inhibitor 13, the performance being to control the condensation of the moisture control material 12. The ratio of the condensation-inhibition enhancer to the additive or additives may be optional. The additive or additives are known to a person having ordinary skill in the art to which the invention pertains. A typical example of the other materials 14 may include, but is not limited to, lubricants, coupling agents, antioxidant, and light-resistant materials such as ultraviolet absorbers and light-stabilizer. The other materials 14 are optional. Namely, the material 10 for key may be free of any other materials 14. The compositional ratio of the other materials 14 may optionally be determined, taking into account the base resin 11 and the moisture control material 12, and the condensation inhibitor 13.

Other example of the acrylic resin that can be used for the base resin 11 may include, but are not limited to, a polycarbonate resin, and a styrene resin. Other examples of the condensation inhibitor 13 may include, but are not limited to, talc, and ceramic powders. Other examples of the other material 14 may include, but are not limited to, any materials that can control the condensation of the moisture control material 12 in cooperation with the condensation inhibitor 13. In other words, condensation-inhibition enhancer may be regarded to enhance the performance of the condensation inhibitor 13, the performance being to control the condensation of the moisture control material 12.

As mentioned above, the Taftic® HU, which is commercially available from Japan Exlan Co., Ltd., can be used as the moisture control material 12. In some cases, particles of the moisture control material 12 may be preferable, wherein the averaged particle size is ranged from 3 micrometers to 5 micrometers. The particles of the moisture control material 12 can be prepared by crushing the Taftic® HU720S to form particles having the averaged particle size in the range of 3 micrometers to 5. Taftic® HU performs chemical sorption (electrostatic sorption) of water molecules or moisture. Taftic® HU does not perform physical sorption of moisture by porosity.

URL:http://www.exlan.co.jp/en/products/tafticHU.html discloses Taftic® HU which has high capacity of sorption and desorption of moisture and high sorption and desorption cyclic performance. Taftic® HU shows sorption and desorption of moisture at a low rate of cyclic volume change which is not greater than 10 percents of the particle diameter.

Japanese Unexamined Patent Application, First Publication, No. 8-225610 discloses moisture control particles which have high performance of sorption and desorption of moisture. The moisture control particles are formed of acrylonitrile polymer. The polymer of the moisture control particles has a carboxylate salt in the side chain thereof, wherein carboxylate salt is represented by —COOM; M is metal ions or organic cations such as amines. The carboxylate salt in the side chain is ionized into —COO$^-$ and M$^+$ in the presence of water molecules so that the ions attract water molecules electrostatically. This phenomenon may be considered as the moisture sorption. The water molecules that were once electrostatically attracted to the ions of —COO$^-$ and M$^+$ can be released from them. In the absence of water molecules or the presence of reduced amount of water molecules, the ions of —COO$^-$ and M$^+$ are not attracted to the water molecules and thus the ions of —COO$^-$ and M$^+$ are combined to form the carboxylate salt of —COOM. This phenomenon may be considered as the moisture desorption.

Typical examples of the moisture control material 12 may include, but are not limited to, high moisture-control particles having high chemical sorption capacity and showing high sorption and absorption cyclic performance with cyclic volume change, wherein the averaged particle diameter is in the range of 3 micrometers to 5 micrometers.

As described above, the typical example of the moisture control material 12 may include, but are not limited to, the polymer having carboxylate salt in the side chain. Other examples of the moisture control material 12 may include, but are not limited to, polymers having ionizable functional groups in the molecular structure. Other examples of the moisture control material 12 may include, but are not limited to, polymers having an ionizable functional group in the side chain of the polymer structure. Yet other examples of the moisture control material 12 may include, but are not limited to, polymers having portions that electrostatically attract water molecules.

The averaged size of the particles of the moisture control material 12 can be measured before the particles of the moisture control material 12 are mixed into the base resin 11. The particles of the moisture control material 12 are dried to reduce the moisture content to a range of 0% to 0.3%. The dried particles of the moisture control material 12 are then dispersed into isopropyl alcohol. The particle size is measured by a laser diffraction scattering method such as a microtrac® method. The laser diffraction scattering method such as a microtrac® method can be realized by an apparatus for measuring particle size distribution. A typical example of the apparatus for measuring particle size distribution may be, but is not limited to, a microtrac HRA which is commercially available from Nikkiso Co., Ltd.

The averaged size of the particles of the moisture control material 12 can be measured after the molding process is carried out. A mold of the material 10 for key is prepared. The mold of the material 10 for key may be shaped in a plate. A surface of the mold of the material 10 for key is buffed or polished so that particles of the moisture control material 12 are exposed on the polished surface of the mold of the material 10 for key. The particle diameters of the particles of the moisture control material 12 that are shown on the surface of the mold of the material 10 for key can be measured by a microscope. At least 25 particles of the moisture control material 12 are measured in particle diameter. An average of the measured particle diameters of the particles of the moisture control material 12 is calculated to find the averaged size of the particles of the moisture control material 12. The measurement of the particle diameters of the particles of the moisture control material 12 is made under two different conditions. The first measurement condition is a normal temperature and normal humidity condition that is regulated by JIS-Z8703. For example, the normal temperature and normal humidity condition is a temperature of 20±15° C. and a humidity of 65±20%. Namely, the mold of the material 10 for key is placed at a temperature of 20±15° C. and a relative humidity of 65±20% for measuring the diameters of the particles of the moisture control material 12 that are shown on the surface of the mold of the material 10 for key.

The second measurement condition is a wet condition that is a temperature of 35° C. and a relative humidity of 90%. Namely, the mold of the material 10 for key is placed at a temperature of 35° C. and a relative humidity of 90% for measuring the diameters of the particles of the moisture control material 12 that are shown on the surface of the mold of the material 10 for key.

The key made of the material 10 for key was compared in characteristics to the key of the conventional material for key.

The conventional material for key is an acrylic resin such as a polymethyl methacrylate (PMMA) resin, or natural or artificial ivory. The key made of the conventional material for key was prepared. The key made of the material 10 for key was prepared. The material 10 for key includes 80 wt % of a polymethyl methacrylate (PMMA) resin as the base resin 11, 3 wt % of Taftic® HU720S having an averaged particle diameter in the range of 3 micrometers to 5 micrometers as the moisture control material 12, 16 wt % of precipitated barium sulfate as the condensation inhibitor 13, and 1 wt % of condensation-inhibition enhancer with other material as the other materials 14. The key made of the material 10 for key will be referred to as an HU key. The made of the acrylic resin such as a polymethyl methacrylate (PMMA) resin will be referred to as a PMMA key. The key made of artificial ivory will be referred to as an artificial ivory key. The key made of natural ivory will be referred to as a natural ivory key.

Figure 2B:
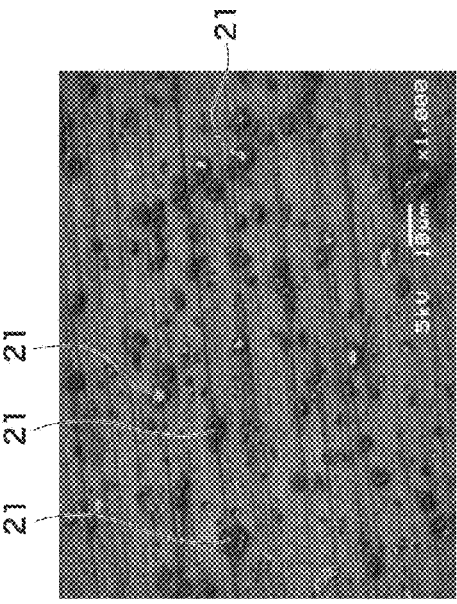
FIG. 2B shows a scanning electron microscope image of an HU key surface which is touched by a finger, wherein the HU key is moisture-absorbed.
Figure 2D:
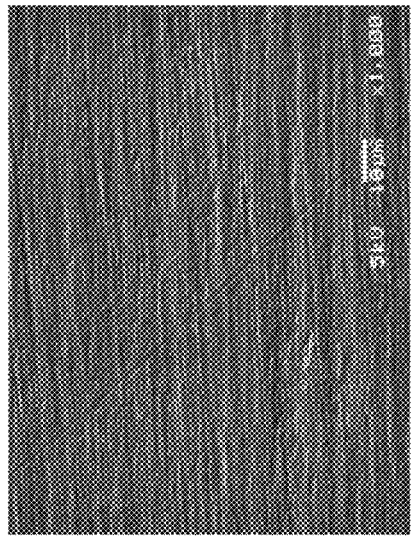
FIG. 2D shows a scanning electron microscope image of an artificial ivory key surface which is touched by a finger, wherein the artificial ivory key has been extrusion-molded and surface-polished.
Figure 2A:
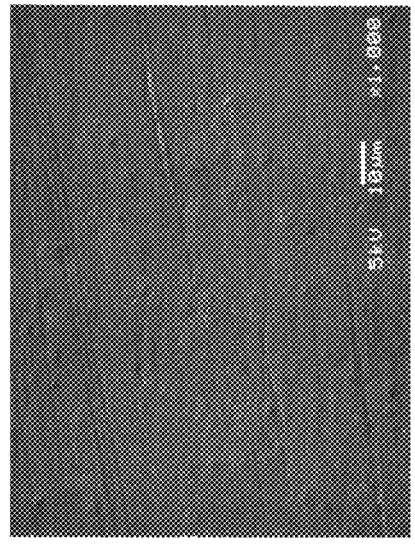
FIG. 2A shows a scanning electron microscope image of an HU key surface which is touched by a finger, wherein the HU key is moisture-desorbed.
Figure 2C:
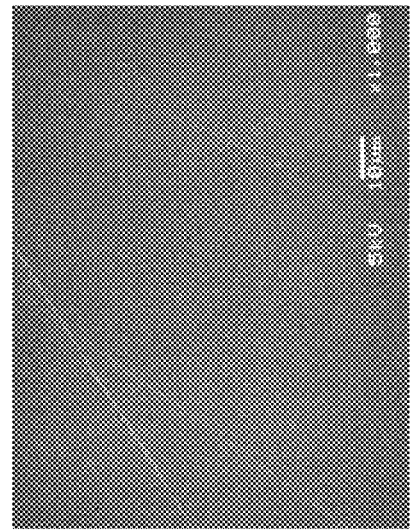
FIG. 2C shows a scanning electron microscope image of a PMMA key surface which is touched by a finger, wherein the PMMA key has been just molded.

FIG. 2A shows a scanning electron microscope image of an HU key surface which is touched by a finger, wherein the HU key is moisture-desorbed. FIG. 2B shows a scanning electron microscope image of an HU key surface which is touched by a finger, wherein the HU key is moisture-absorbed. FIG. 2C shows a scanning electron microscope image of a PMMA key surface which is touched by a finger, wherein the PMMA key has been just molded. FIG. 2D shows a scanning electron microscope image of an artificial ivory key surface which is touched by a finger, wherein the artificial ivory key has been extrusion-molded and surface-polished. The artificial ivory may be realized by mixing fibrous filler into the base resin PMMA. The fibrous filler may be made of basic magnesium sulfate. The fibrous filler of basic magnesium sulfate may be Fibrous Magnesium Oxysulfate (MOS-HIGE®) that is commercially available from Ube Material Industries Ltd. In some cases, 20 wt % of Fibrous Magnesium Oxysulfate (MOS-HIGE®) may be mixed into the base resin PMMA. Each of the scanning electron microscope images of FIGS. 2A through 2D shows straight-lined scratches which are formed by polishing and buffing the surface of the key. The straight-lined scratches are not significant in comparison between the HU key and the PMMA key or the artificial ivory key.

The HU key that is moisture-desorbed has a flat surface as shown in FIG. 2A. The HU key that is moisture-absorbed has a non-flat surface having micro-convexes 21 as shown in FIG. 2B. In typical examples, the micro-convex 21 may be a dome-shaped ridge which is formed by volume expansion of condensation or colony of the moisture-absorbed moisture control material 12. The micro-convexes 21 are almost uniformly distributed but not localized over the entire key surface. As shown in FIGS. 2C and 2D, the PMMA key and the artificial ivory key have surfaces being flat or free of any convexes or ridges. The PMMA key and the artificial ivory key have such flat surfaces even at a high humidity.

Figure 3:
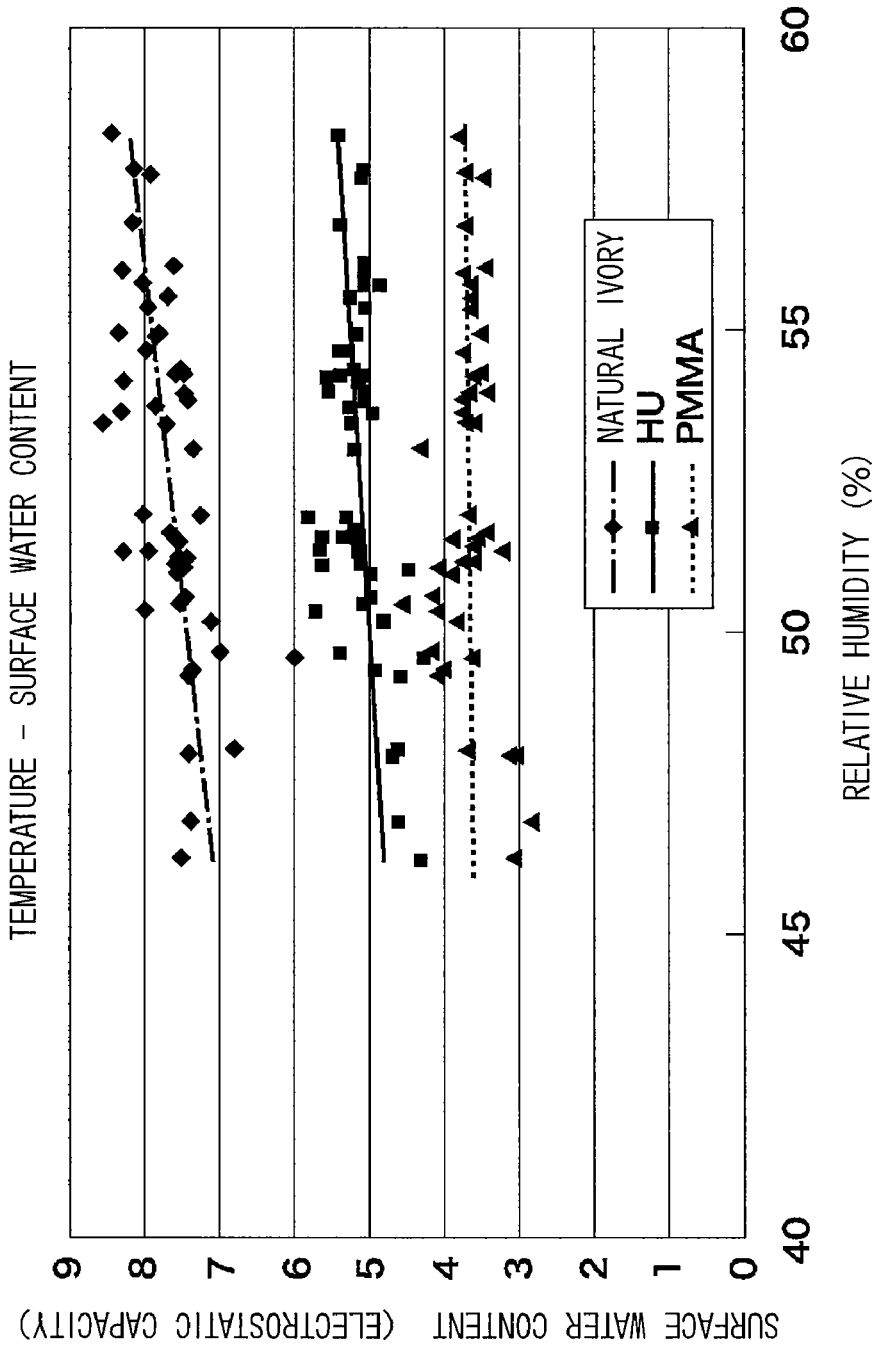
FIG. 3 is a graph showing relationships between surface moisture content and relative humidity for the PMMA key, the natural ivory key and the HU key.

FIG. 3 is a graph showing relationships between surface moisture content and relative humidity for the PMMA key, the natural ivory key and the HU key. The horizontal axis represents the relative humidity (%) of an atmosphere in which the PMMA key, the natural ivory key and the HU key are placed. The vertical axis represents the moisture content on the surfaces of the PMMA key, the natural ivory key and the HU key. The moisture content on each key surface corresponds to electrostatic capacity. Namely, the moisture content on each key surface is measured by measuring electrostatic capacity on the surfaces of the PMMA key, the natural ivory key and the HU key that have been placed at a relative humidity for long time.

The PMMA key is almost constant in the surface moisture content over the relative humidity. The natural ivory key and the HU key increase in the surface moisture content as the relative humidity increases. The HU key is as high in moisture-sorption capacity as the natural ivory key at high humidity.

Figure 4:
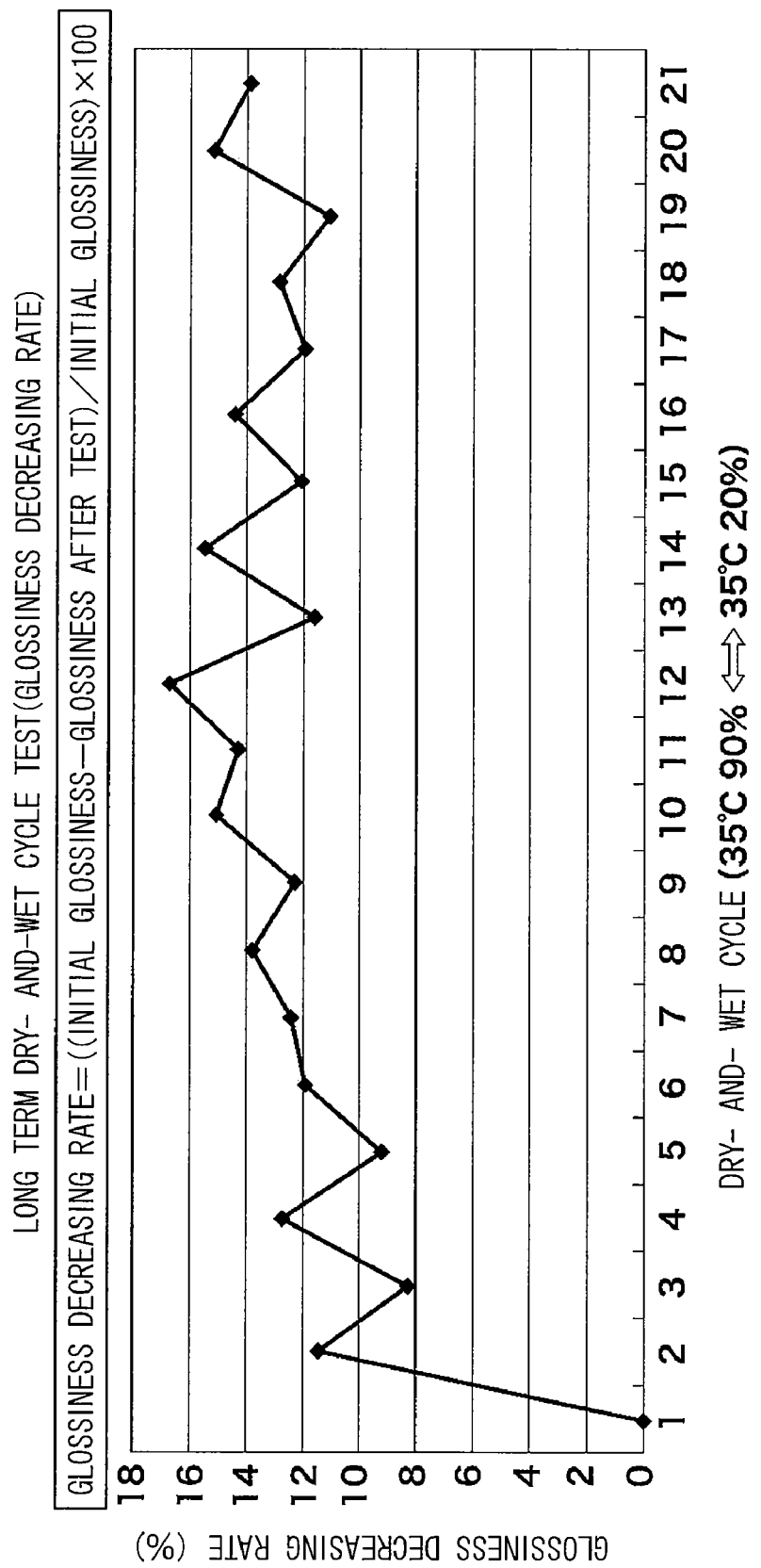
FIG. 4 is a graph showing variations of the glossiness decreasing rate of the HU key surface over dry-and-wet cycles for long term.

FIG. 4 is a graph showing variations of the glossiness decreasing rate of the HU key surface over dry-and-wet cycles for long term. The horizontal axis represents the dry-and-wet cycles. The vertical axis represents the glossiness decreasing rate (%) of the HU key surface. The dry-and-wet cycle test was carried out at a fixed temperature of 35° C. in the range of relative humidity from 20% to 90%. At the lowest relative humidity of 20%, the HU key is placed for a long time, for example, 48 hours. At the highest relative humidity of 90%, the HU key is placed for a long time, for example, 48 hours. The odd number of the dry-and-wet cycles represents that the HU key is placed in the dry atmosphere at the lowest relative humidity of 20%. The even number of the dry-and-wet cycles represents that the HU key is placed in the wet atmosphere at the highest relative humidity of 90%. The first cycle "1" represents that the HU key has not absorbed moisture yet just after the HU key was formed. The total time of the wet cycles until the twenty-first cycle "21" for placing the HU key in the wet atmosphere at the highest relative humidity of 90% is 1372 hours. The averaged period of time of the wet cycles is 137 hours. The total time of the dry cycles until the twenty-first cycle "21" for placing the HU key in the dry atmosphere at the lowest relative humidity of 20% is 1416 hours. The averaged period of time of the dry cycles is 142 hours.

The glossiness of the key surface is a parameter which indicates the roughness of the key surface. The glossiness can be measured by measuring a reflection of light from the key surface under predetermined conditions. The glossiness decreasing rate in each cycle "n" is given by $(G1-Gn) \times 100/G1$. G1 represents the initial glossiness which is the glossiness measured in the first cycle "1". Gn represents the glossiness measured in the n-th cycle "n", for example, in each of the second to twenty-first cycles.

The glossiness decreasing rate cyclically varies over the dry-and-wet cycles. The glossiness decreasing rate becomes lower in the dry cycles. The glossiness decreasing rate becomes higher in the wet cycles. Except for the first cycle "1", recoveries of the glossiness decreasing rate can be obtained at almost constant values respective over the dry and wet cycles. The variations of the glossiness decreasing rate over the dry-and-wet cycles are generally reversible. The glossiness decreasing rate increases greatly at the transition from the first cycle "1" to the second cycle "2". Then, during the second or later cycles, the glossiness decreasing rate does not return to the initial value in the first cycle "1". It can be presumed that the moisture control material 12 on the key surface shows such a great expansion as to cause plastic deformation of the key. It can also be presumed that the key shows expansion and shrinkage cycle in the elastic zone after the second cycle "2".

Figure 5:
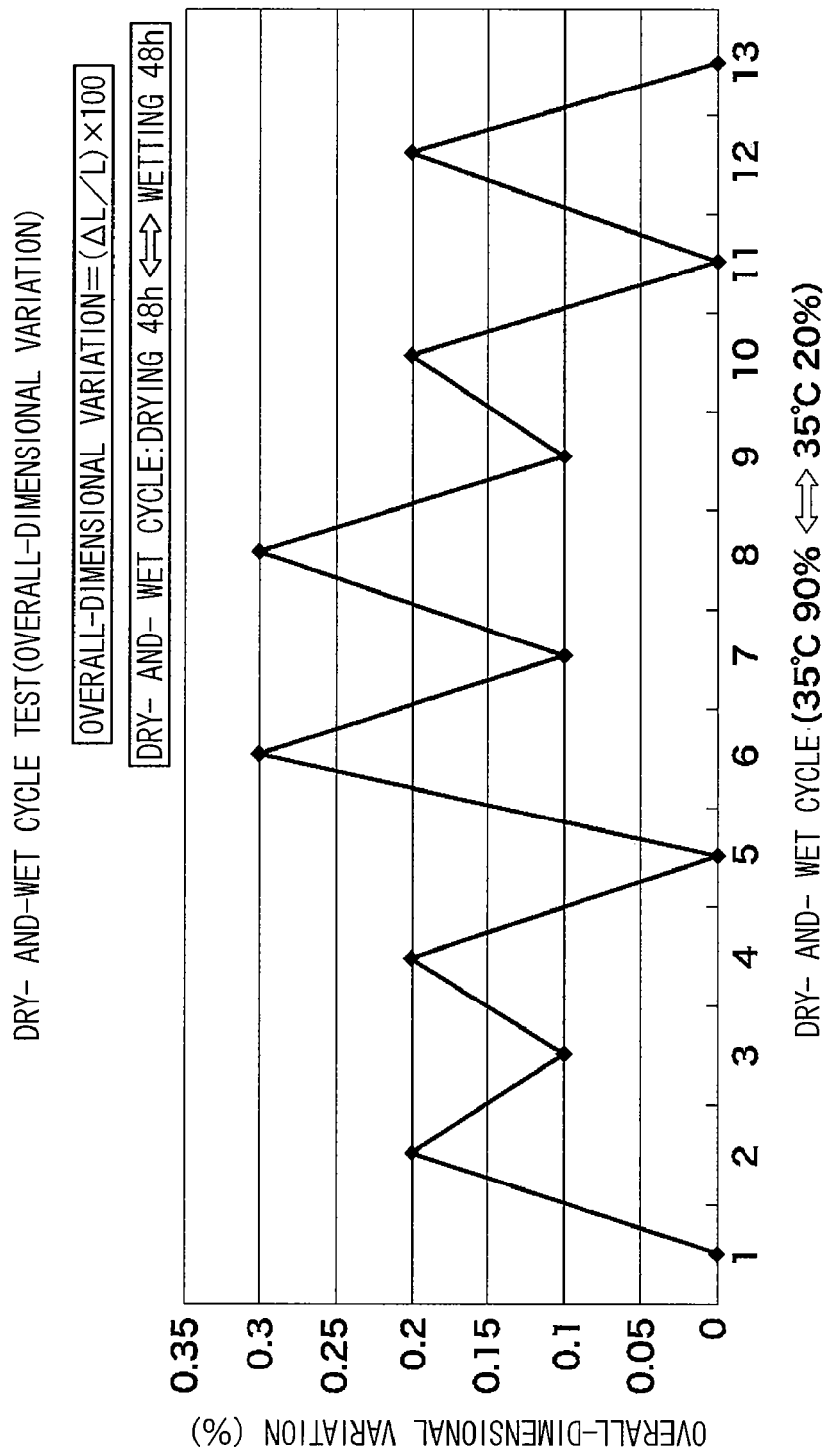
FIG. 5 is a graph showing variations of the overall-dimension of the HU key over dry-and-wet cycles for long term.

FIG. 5 is a graph showing variations of the overall-dimension of the HU key over dry-and-wet cycles for long term. The horizontal axis represents the dry-and-wet cycles. The vertical axis represents the variations of the overall-dimension of the HU key. The overall-dimension means the full length of the HU key in the longitudinal direction. The dry-and-wet cycle test was carried out at a fixed temperature of 35° C. in the range of relative humidity from 20% to 90%. The odd number of the dry-and-wet cycles represents that the HU key is placed in the dry atmosphere at the lowest relative humidity of 20%. The even number of the dry-and-wet cycles represents that the HU key is placed in the wet atmosphere at the highest relative humidity of 90%. The first cycle "1" represents that the HU key has not absorbed moisture yet just after the HU key was formed.

The variation of the overall-dimension is given by $\Delta L \times 100/L$, were L is the initial full length of the HU key in the longitudinal direction in the first cycle "1", and $\Delta L$ is given by subtraction of Ln from L, and Ln is the full length of the HU key in the longitudinal direction in the n-th cycle or each of the second to thirteenth cycles "2" to "13".

The variation of the overall-dimension of the HU key is cyclically changed over the dry-and-wet cycles. The overall-dimension of the HU key becomes shorter in the dry cycles. The overall-dimension of the HU key becomes longer in the wet cycles. The recovery of the variation of the overall-dimension of the HU key can be obtained at almost constant values respective over the dry and wet cycles. The cyclic change of the overall-dimension variation of the HU key over the dry-and-wet cycles is generally reversible. Also, the overall-dimension of the HU key over the dry-and-wet cycles is generally reversible. In the fifth and eleventh cycles "5" and "11", the overall-dimension of the HU key is recovered to the initial overall-dimension L, even the glossiness decreasing rate is not recovered to the initial value. From this phenomenon, it can be presumed that the dimensional change of the inner portion of the HU key is caused in elastic zone, different from the surface thereof.

Figure 6:
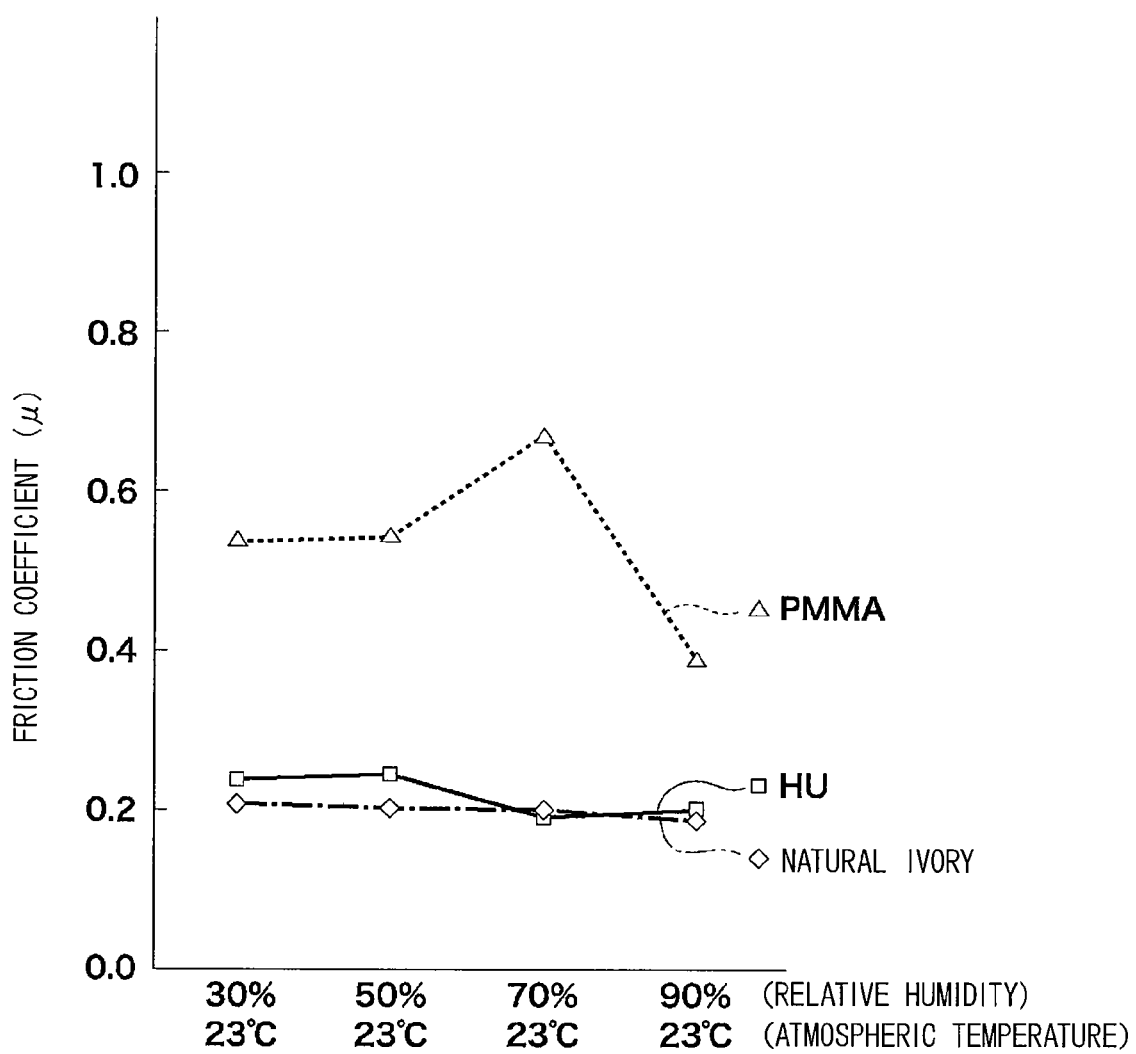
FIG. 6 is a graph showing variations of the friction coefficient ($\mu$) of the surfaces of the PMMA key, the natural ivory key and the HU key over relative humidity at a constant temperature.

FIG. 6 is a graph showing variations of the friction coefficient ($\mu$) of the surfaces of the PMMA key, the natural ivory key and the HU key over relative humidity at a constant temperature. The horizontal axis represents relative humidity (%). The vertical axis represents the coefficient of static friction ($\mu$). The coefficient of static friction ($\mu$) is measured at relative humidity of 30%, 50%, 70% and 90% at a constant temperature of 23° C. A probe of synthetic leather for human finger is used. The probe is made into contact with the key surface at a load of 50 g, while the probe slides at a speed of 1 mm/sec along the surface in the longitudinal direction of the key. This may generally correspond to light touch on the key.

According to Coulomb's law of friction, the maximum friction force F is given by $F = \mu \times N$, where $\mu$ is the coefficient of static friction, and N is the normal force. The load of 50 g as the normal force is applied to the key surface. Pulling force applied to the key surface in the longitudinal direction of the key is gradually increased until the probe becomes slipped on the key surface. The pulling force, at which the probe is initiated to be slipped on the key surface, is considered as the maximum friction force F. The coefficient of static friction $\mu$ is calculated in accordance with Coulomb's law of friction.

As shown in FIG. 6, the coefficient of static friction $\mu$ of the surface of the HU key varies in the narrower range of 0.21 to 0.26 over the variation of humidity from 30% to 90%. Namely, the surface of the HU key has smaller variation of the coefficient of static friction $\mu$ in the range of humidity from 30% to 90%. The coefficient of static friction $\mu$ of the surface of the natural ivory key varies in the narrower range of 0.19 to 0.21 over the variation of humidity from 30% to 90%. Namely, the surface of the natural ivory key has smaller variation of the coefficient of static friction $\mu$ in the range of humidity from 30% to 90%. In contrast to the HU key and the natural ivory key, the coefficient of static friction $\mu$ of the surface of the PMMA key varies in the wider range of 0.39 to 0.68 over the variation of humidity from 30% to 90%. Namely, the surface of the PMMA key has larger variation of the coefficient of static friction $\mu$ in the range of humidity from 30% to 90%. The surface of the PMMA key remains higher in the coefficient of static friction µ than the surfaces of the natural ivory key and the HU key. FIG. 6 demonstrates that the natural ivory key and the HU key do in general provide more constant feelings in touching the keys in the range of humidity from 30% to 90% as compared to the PMMA key.

The HU key may provide non-sticky touch feeling as well as non-slippery touch feeling over the dry and wet conditions. On the surface of the HU key, the particles of the moisture control material 12 are almost uniformly distributed. The particles of the moisture control material 12 show sorption of moisture on the surface of the HU key. And when the particles of the moisture control material 12 show moisture sorption, volume expansion of the particles of the moisture control material 12 is caused, whereby micro convexes 21 are formed over the surface of the moisture control material 12. The micro convexes 21 are almost uniformly distributed on the surface of the HU key. The micro convexes 21 may reduce the contact area between the surface of the HU key and a finger which touched the HU key. So, the HU key provides non-sickly touch feeling not only in the dry condition but in the wet condition.

The non-sticky touch feeling provided by the HU key is different from any slippery feeling. In general, the HU key may prevent the finger of a performer from being slipped on the key surface when the performer plays an instrument with the HU key. The performer can not feel a finger-slipping on the HU key. It is presumed that when the performer presses a finger on the HU key to play the instrument, the non-flat surface with the micro-convexes 21 of the HU key may grip the finger.

When the HU key is placed in the dry atmosphere, the particles of the moisture control material 12 may perform the moisture-desorption, thereby reducing the volumes of the particles of the moisture control material 12, and possible resulting in disappearance of the micro-convexes 21 over the surface of the HU key in the dry condition. The micro-convexes 21 appear in the wet condition and almost disappear in the dry condition. Thus, the HU key can stably provide non-slippery and non-sticky good touch feeling over the dry and wet cycles due to moisture-sorption-desorption performance of the particles of the moisture control material 12 that are almost uniformly distributed over the surface of the HU key.

The moisture sorption by the moisture control material 12 of the HU key is the chemical sorption but not physical sorption by porous surface. The micro-convexes 21 appear on the surface of the HU key under the wet condition. The micro-convexes 21 disappear under the dry condition. In general, this may not cause the adhesion or residue of dirt on or around the micro-convexes 21 over the surface of the HU key.

The surface of the conventional key can be given roughness by the known surface-roughing process. The rough surface of the conventional key can be worn to become smooth and to be slippery by long time use.

The surface of the HU key can also be worn by use, thereby forming a newly exposed surface of the HU key. The newly exposed surface of the HU key, however, has almost uniform distribution of the particles of the moisture control material 12. Placing the HU key under the wet condition causes that the particles of the moisture control material 12 perform moisture-sorption, thereby forming almost uniform distribution of new micro-convexes 21 over the newly exposed surface of the HU key. The HU key can continue to provide non-slippery and non-sticky good touch feeling for long time.

The conventional method of forming the resin key can be applied to form the HU key of the material 10 for key. No additional expenditure is necessary. It is possible to form the HU key at low cost. It is easy to maintain the material 10 for key.

In one example, the compositional ratio of the material 10 for key shown on the above Table 1 may be preferable to obtain proper size and number of micro-convexes 21 over the surface of the HU key. The condensation inhibitor 13 inhibits or controls the condensation of the particles of the moisture control material 12. The moisture control material 12 is likely to show moisture-sorption and condensation, during the sequential processes for measuring the raw materials, tumbling or mixing the raw materials, and loading the mixed material to the extruder. It should be presented that the moisture control material 12 shows excess condensation and localization, thereby forming large colony of the moisture control material 12. The excess condensation and localization or the large colony of the moisture control material 12 form large-concaves that are localized. The excess condensation and localization makes it difficult to obtain almost uniform distribution of the micro-convexes 21 over the surface of the HU key.

The condensation inhibitor 13 is added to properly control the condensation of the particles of the moisture control material 12. The condensation-inhibition enhancer as the other materials 14 performs in cooperation with the condensation inhibitor 13 to properly control the condensation of the moisture control material 12.

The above described limited range of 3 micrometers to 5 micrometers of the averaged size of the particles of the moisture control material 12 may contribute to obtain almost uniform distribution of the particles of the moisture control material 12 over the surface of the HU key, wherein the particle may be considered as a small colony or condensation of the moisture control material 12. The above described limited range of 2% to 4% of the compositional ratio of the moisture control material 12 may contribute to obtain almost uniform distribution of the particles of the moisture control material 12 over the surface of the HU key, wherein the particle may be considered as a small colony or condensation of the moisture control material 12

The compositional ratio of the material 10 for key can be modified as long as the conditions shown on Table 1 are satisfied. It was confirmed by performers or players that the following modifications to the compositional ratio of the material 10 for key provide non-slippery and non-sticky good touch feeling. The material 10 for key may be modified in compositional ratio at 81 wt % of the base resin 11, 2 wt % of the moisture control material 12, 16 wt % of the condensation inhibitor 13, and 1 wt % of the other materials 14. Also, the material 10 for key may be modified in compositional ratio at 60 wt % of the base resin 11, 4 wt % of the moisture control material 12, 35 wt % of the condensation inhibitor 13, and 1 wt % of the other materials 14.

It was also confirmed that the HU key of the material 10 for key which does not satisfy the limited ranges shown on Table 1 may not provide the non-slippery and non-sticky good touch feeling. Particularly, if the compositional ratio of the moisture control material 12 is out of the limited range of 2 wt % to 4 wt %, it is unlikely to cause proper condensation of the moisture control material 12 that needs to form almost uniform distribution of the proper-sized particles of the moisture control material 12. In this case, the key might no longer provide the non-slippery and non-sticky good touch feeling.

If the compositional ratio of the moisture control material 12 is out of the limited range of 2 wt % to 4 wt %, improper condensation of the moisture control material 12 is unlikely to form almost uniform distribution of the micro-convexes 21 over the surface of the HU key. And crack may be caused by improper volume expansion of the moisture control material 12.

If the compositional ratio of the moisture control material 12 is out of the limited range of 2 wt % to 4 wt %, insufficient admixture of the moisture control material 12 into the base resin 11 may form voids or crack in the pellet of the material 10 for key.

If the averaged size of the particles of the moisture control material 12 is out of the limited range of 3 micrometers to 5 micrometers, it is unlikely to form almost uniform distribution of the micro-convexes 21 over the surface of the HU key, or crack may be caused in a key by improper volume expansion of the particles of the moisture control material 12.

The HU key of such compositional ratio and/or the average sized of the particles of the moisture control material 12 might no longer provide the non-slippery and non-sticky good touch feeling.

The material 10 for key includes particles of moisture control material 12 as filler, wherein the averaged size of the particles is in the range of 3 micrometers to 5 micrometers. The almost uniform distribution of the micro-convexes 21 appears over the surface of the HU key in the wet condition. The micro-convexes 21 disappear on the surface of the HU key in the dry condition. The surface of the HU key is unlikely to adhere dart. The surface of the HU key may provide the non-slippery and non-sticky good touch feeling not only in the dry condition but in the wet condition, thereby allowing a performer or player to exhibit his or her best performance. Addition of the condensation inhibitor 13 alone or in combination with the condensation-inhibition enhancer as the other materials 14 may adjust the size and distribution of the micro-convexes 21 over the surface of the HU key so as to provide the non-slippery and non-sticky good touch feeling.

The condensation inhibitor 13 and the condensation-inhibition enhancer as the other materials 14 are optional fillers which might be included in the material 10 for key if necessary. The material 10 for key may be free of the condensation inhibitor 13 and the condensation-inhibition enhancer as the other materials 14 as long as the condensation of the moisture control material 12 can properly be controlled during the sequential processes for measuring the raw materials, tumbling or mixing the raw materials, and loading the mixed material to the extruder. If those sequential processes are carried out under a dry condition or vacuum condition, it might be possible to reduce the amounts of the optional fillers in the material 10 for key, or possible that the material 10 for key is free of the optional fillers.

The material 10 for key can be applied to any other parts, products or articles than the key of the key board as long as any other parts, products or articles are adapted to contact with a finger or a hand of a person.

EXAMPLE

Polymethyl methacrylate (PMMA) resin was prepared as the base resin 11. Taftic® HU having an averaged particle diameter of 3.6 micrometers was prepared as the moisture control material 12. Precipitated barium sulfate was prepared as the condensation inhibitor 13. 3 wt % of Taftic® HU as the moisture control material 12 and 16 wt % of precipitated barium sulfate as the condensation inhibitor 13 were mixed to the PMMA resin 11, thereby preparing a material for key. The material for key was then molded to form mold-plates of the material for key. Each mold-plate has a width of 48 mm, a length of 86 mm and a thickness of 2.3 mm. A surface of the mold-plate was buffed or polished. Particles of the moisture control material 12 are exposed on the polished surface of the mold-plate.

The mold-plate was placed under the normal temperature and normal humidity condition, for example, at a temperature of 22° C. and a humidity of 60% for 552 hours before the particle diameters of the particles of the moisture control material 12 that are shown on the surface of the mold-plate were measured by a microscope. The averaged particle diameter was 3.5 micrometers under the normal temperature and normal humidity condition.

The other mold-plate was placed under the wet condition, for example, at a temperature of 35° C. and a humidity of 90% for 552 hours before the particle diameters of the particles of the moisture control material 12 that are shown on the surface of the mold-plate were measured by a microscope. The averaged particle diameter was 3.5 micrometers under the wet condition.

Evaluation:

No significant variation in particle diameter of the particles of the moisture control material 12 was observed between before the particles of the moisture control material 12 was mixed to the PMMA resin 11 and after the material 10 for key including the particles of the moisture control material 12 was molded.

The particles of the moisture control material 12 of the mold-plate are slightly smaller in particle diameter than the particles of the moisture control material 12 before the particles of the moisture control material 12 are mixed into the PMMA resin 11. It is presumed that such slight reduction in particle diameter of the particles of the moisture control material 12 is due to the difficulty in determining the external shape of the particles of the moisture control material 12 which are partially embedded in the PMMA resin 11 as the base material. It is also presumed that such slight reduction in particle diameter of the particles of the moisture control material 12 is due to measuring the diameter of exposed portions of the particles shown on the polished surface of the mold-plate, where the measured diameters of some of the particles of the moisture control material 12 are not maximum diameter thereof.

No significant variation in particle diameter of the particles of the moisture control material 12 was observed between under the normal temperature and normal humidity condition and the wet condition. The following reasons for causing such no significant variation can be presumed.

First, the particles of the moisture control material 12 show significant volume expansion under the wet condition so that the expanded particles of the moisture control material 12 are discriminative from the PMMA resin 11 as the base material. In contrast, the particles of the moisture control material 12 show insignificant volume expansion under the normal temperature and normal humidity condition as compared to that under the wet condition. The expanded particles of the moisture control material 12 under the normal temperature and normal humidity condition are not so discriminative from the PMMA resin 11 as the base material as compared to that under the wet condition. Some of the particles having smaller diameters shown on the polished surface of the mold-plate might be overlooked, resulting in slightly increase of the averaged value of the particle diameters.

Second, the particles of the moisture control material 12 are likely to show anisotropic volume expansion under the wet condition. Namely, the volume expansion of the particles of the moisture control material 12 under the wet condition is not omnidirectional and not uniform. Outward expansion of the particles of the moisture control material 12 from the polished surface of the mold-plate is significant under the wet condition due to no coverage or thin-coverage by the PMMA resin 11 as the base material. Increasing the dimension of the particles of the moisture control material 12 is more significant in the direction that is vertical to the polished surface of the mold-plate than increasing the dimension thereof in the horizontal direction parallel to the polished surface of the mold-plate. In general, the dimension in the horizontal direction of the particles of the moisture control material 12 may be measured, and the dimension in the horizontal direction of the particles of the moisture control material 12 may not be measured. The measured particle diameters might be insignificantly different between under the wet condition and under the normal temperature and normal humidity condition. Thus, the calculated average particle diameter might be insignificantly different between under the wet condition and under the normal temperature and normal humidity condition.

The above-described range of the averaged particle diameter from 3 micrometers to 5 micrometers is the range of the average of particle diameters that are measured either before the particles of the moisture control material 12 are mixed to the based resin 11 or after the material 10 for key is molded as a product.

The terms of degree such as "substantially," "about," and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A material for a key of a keyboard instrument, the material comprising:
    a base resin that includes at least one of an acrylic resin, a polycarbonate resin and a styrene; and
    particles of a polymer as a moisture control material that performs chemical sorption of moisture, the polymer as the moisture control material increasing in volume with moisture-sorption, the moisture control material decreasing in volume with moisture-desorption.

2. The material according to claim 1, wherein the particles have an averaged particle size in the range of 3 micrometers to 5 micrometers.

3. The material according to claim 1, wherein the content of the moisture control material is ranged from 2 wt % to 4 wt %.

4. The material according to claim 1, further comprising:
    a condensation inhibitor that controls condensation of the particles of the moisture control material during production process for producing the material.

5. The material according to claim 1, wherein the material has a friction coefficient in the range of 0.21 to 0.26 at a relative humidity ranged from 30% to 90%.

6. The material according to claim 1, wherein the polymer has an ionizable functional group in its side chain.

7. A key for a keyboard instrument, the key comprising:
    a base resin that includes at least one of an acrylic resin, a polycarbonate resin and a styrene resin; and
    particles of a polymer that shows sorption and desorption of moisture, the polymer increasing in volume with moisture-sorption, the polymer decreasing in volume with moisture-desorption, the particles having an averaged particle size in the range of 3 micrometers to 5 micrometers,
    wherein the key has a friction coefficient in the range of 0.21 to 0.26 at a relative humidity ranged from 30% to 90%.

8. The key according to claim 7, wherein the content of the polymer is ranged from 2 wt % to 4 wt %.

9. The key according to claim 7, wherein the polymer has an ionizable functional group in its side chain.

* * * * *